(12) United States Patent
Szimandl

(10) Patent No.: US 12,162,444 B2
(45) Date of Patent: Dec. 10, 2024

(54) ACTUATING DEVICE FOR A MECHANICAL BRAKE SYSTEM

(71) Applicants: THYSSENKRUPP PRESTA AKTIENGESELLSCHAFT, Eschen (LI); thyssenkrupp AG, Essen (DE)

(72) Inventor: Barna Szimandl, Gams (CH)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 333 days.

(21) Appl. No.: 17/630,062

(22) PCT Filed: Jul. 23, 2020

(86) PCT No.: PCT/EP2020/070737
§ 371 (c)(1),
(2) Date: Jan. 25, 2022

(87) PCT Pub. No.: WO2021/018705
PCT Pub. Date: Feb. 4, 2021

(65) Prior Publication Data
US 2022/0250597 A1    Aug. 11, 2022

(30) Foreign Application Priority Data

Jul. 26, 2019   (DE) .................... 10 2019 120 341.4

(51) Int. Cl.
*B60T 13/04* (2006.01)
*B60T 13/74* (2006.01)
(Continued)

(52) U.S. Cl.
CPC ............ *B60T 13/04* (2013.01); *B60T 13/743* (2013.01); *F16D 65/183* (2013.01); *B60T 2270/402* (2013.01); *F16D 65/40* (2013.01)

(58) Field of Classification Search
CPC .. B60T 13/04; B60T 13/743; B60T 2270/402; F16D 65/40; F16D 65/183
(Continued)

(56) References Cited

U.S. PATENT DOCUMENTS

| 5,501,305 A | 3/1996 | Stalmeir et al. |
| 8,448,757 B2 * | 5/2013 | Vollert ................. F16D 65/567 |
| | | 188/196 D |

(Continued)

FOREIGN PATENT DOCUMENTS

| CN | 106164525 A | 11/2016 |
| CN | 108167434 A | 6/2018 |

(Continued)

OTHER PUBLICATIONS

English Translation of International Search Report issued in PCT/EP2020/070737, dated Sep. 8, 2020.

*Primary Examiner* — Christopher P Schwartz
(74) *Attorney, Agent, or Firm* — hyssenkrupp North America, LLC

(57) ABSTRACT

An actuating device may include an energy recovery unit for a mechanical brake system. The actuating device may have an actuating drive for a brake application movement of a brake part for a service brake function. The actuating device has a force cartridge with a prestressed spring and with a ramp bearing as the energy recovery unit The ramp bearing may be fastened to the actuating drive on one side and to the spring on the other side. The force cartridge is fitted on a line of force action of the actuating drive and interacts with the actuating drive such that a force component for assisting the actuating drive is provided in a manner dependent on an adjustment position of the actuating drive.

20 Claims, 5 Drawing Sheets

(51) Int. Cl.
  *F16D 65/18*   (2006.01)
  *F16D 65/40*   (2006.01)
(58) Field of Classification Search
  USPC ............ 188/72.1–72.3, 72.7–72.9, 156, 158, 188/196 B, 196 D
  See application file for complete search history.

(56)        References Cited

U.S. PATENT DOCUMENTS

| | | | |
|---|---|---|---|
| 8,511,439 | B2 | 8/2013 | Baumgartner et al. |
| 10,407,041 | B2 | 9/2019 | Heubner et al. |
| 2003/0034212 | A1* | 2/2003 | Gradert ............... F16D 65/18 188/167 |
| 2004/0089505 | A1* | 5/2004 | Audren ............... F16D 65/567 188/71.5 |
| 2004/0124042 | A1* | 7/2004 | Kriz, II ............... F16D 65/18 188/162 |
| 2020/0096067 | A1* | 3/2020 | Boyle ............... F16D 65/0971 |
| 2020/0189549 | A1* | 6/2020 | Mazzarini ............ B60T 13/746 |

FOREIGN PATENT DOCUMENTS

| | | |
|---|---|---|
| DE | 100 46 981 A1 | 4/2002 |
| DE | 10140076 A1 | 2/2003 |
| DE | 103 19 082 B3 | 12/2004 |
| DE | 10 2005 030 621 A1 | 4/2006 |
| DE | 102006050804 A1 | 10/2007 |
| DE | 10 2007 055 637 A1 | 5/2009 |
| DE | 10 2009 055 265 A1 | 6/2011 |
| DE | 2009 055 265 A1 | 6/2011 |
| DE | 10 2017 123 266 A1 | 4/2019 |
| EP | 0 644 358 B1 | 3/1995 |
| EP | 2005022 B1 | 4/2007 |
| EP | 1 421 293 B1 | 6/2011 |
| EP | 1244879 B1 | 9/2012 |
| EP | 2 574 817 B1 | 1/2016 |
| WO | 0144677 A1 | 6/2001 |
| WO | 0225136 A1 | 3/2002 |
| WO | 03016745 A1 | 2/2003 |
| WO | 2019068794 A1 | 4/2019 |

* cited by examiner

ACTUATING DEVICE FOR A MECHANICAL BRAKE SYSTEM

CROSS REFERENCE TO RELATED APPLICATIONS

This application is a U.S. National Stage Entry of International Patent Application Serial Number PCT/EP2020/070737, filed Jul. 23, 2020, which claims priority to German Patent Application No. DE 10 2019 120 341.4, filed Jul. 26, 2019, the entire contents of both of which are incorporated herein by reference.

FIELD

The present disclosure generally relates to brake systems, including actuating devices for mechanical brake systems and actuating devices for applying a brake lining to a brake disk.

BACKGROUND

Motor vehicles or elevators, in particular, use electromechanical brakes or an actuating device for a mechanical brake, which over time are being developed to be smaller. Here, it is sought inter glia to reduce the power requirement for electric drive or actuating motors of the mechanical brakes through the use of an energy recovery unit.

Energy recovery units are known from the prior art, for example from EP2005022 (Knorr 2006) or EP1244879B1 (Wabco 1999). The principle is based on the exchange of energy between the brake system, in particular the brake caliper clamped during braking, and an additional energy store. During braking, the brake caliper is elastically deformed by the braking forces. When the brake is released, this energy stored in the brake caliper is transferred to an energy store or is temporarily stored, and is used for an impending braking operation for the brake application movement. Energy stores are also known under the name of force store or force cartridge. They are designed, for example, as spring elements integrated into the actuating drive of the electromechanical brake. Here, the actuating drive is approximately in a bistable state, which can be deflected to one side (brake application) or the other side (release of the brake) by small forces.

EP2005022 (Knorr 2006) presents such an energy recovery unit with an energy store, which is connected to a lever arrangement. The energy store is controlled by means of an eccentrically mounted cam disk, wherein the lever position and cam disk contour are set in relation to one another such that a bistable state is always achieved. A disadvantage of this solution is the large installation space. The inertia of the lever arrangement must also be concomitantly moved during every adjustment. This is disadvantageous for fast response times.

EP1244879B1 (Wabco 1999) presents an energy recovery unit with a fixed energy store 128 and two lever-like contours 101, 102, which energy recovery unit is actuated by way of a double roller (roller 126—contour 108, roller 127—contour 109). A disadvantage is the additional installation space that must be reserved for the energy store. It is particularly disadvantageous that no wear-compensating readjustment is possible.

DE10140076A1 (WABCO 2006) presents an energy recovery unit with rotatable cams 4, 5. The cams are situated one inside the other and have different outside diameters. The cams are fixedly connected radially and axially, that is to say the two cams always have the same angle of relative rotation and the same adjustment height. The braking operation is initiated by way of the rotation about axis 17, 19 of the roller holder with rollers 15, 15a. The brake is applied by means of a lever 18". A disadvantage is the additional installation space that must be reserved for the energy store. The point of engagement 17 of a drive (not illustrated) in the immediate vicinity of the brake disk 21 is particularly disadvantageous.

Thus, a need exists to overcome or at least reduce the aforementioned disadvantages, and in particular to specify an actuating device with an energy recovery unit in a compact design.

DETAILED DESCRIPTION

Figure 1:
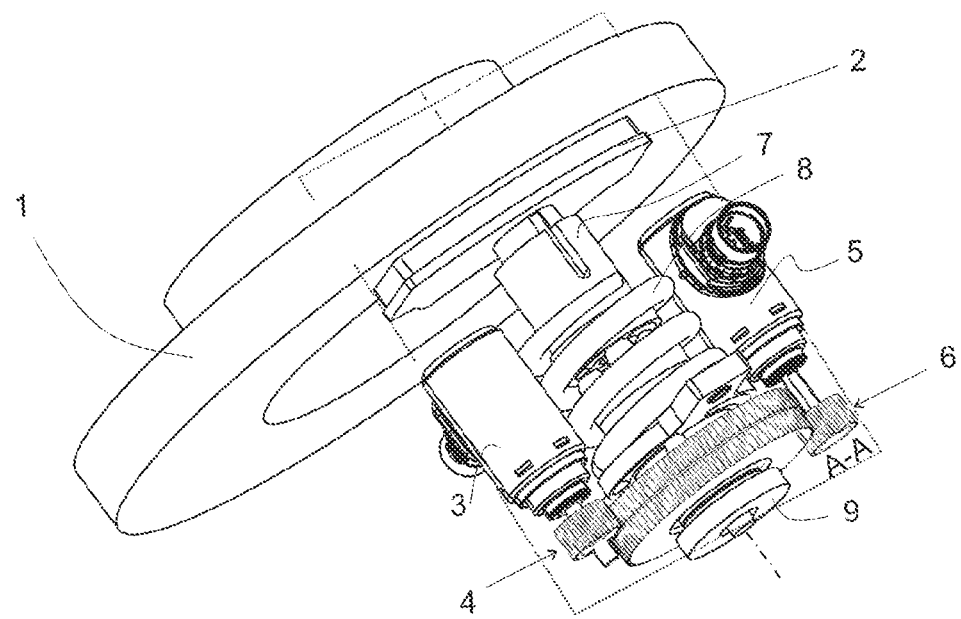
FIG. 1 is a perspective view of a mechanical brake system with an example actuating device.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure provides an actuating device for a mechanical brake system. In some examples, this involves an actuating device with an energy recovery unit for a mechanical brake system, wherein the actuating device has an actuating drive for the brake application movement of a brake part for a service brake function. The actuating device has a force cartridge with a prestressed spring and with a ramp bearing as an energy recovery unit, wherein the ramp bearing is fastened to the actuating drive on one side and to the spring on the other side. The force cartridge interacts with the actuating drive such that a force component for assisting the actuating drive is provided in a manner dependent on the adjustment position of the actuating drive. In addition, the force cartridge is fitted in particular on a line of force action of the actuating drive.

This assistance makes it possible for the actuating motors to be dimensioned to be smaller, and to be able to provide a lower rotational speed or a resulting lower torque (with gearbox). This means that cheaper actuating motors can be used. In addition, the necessary energy consumption of the actuating motors is reduced.

The ramp bearing preferably has a cam track with one or more linear and/or non-linear regions. The cam track may be adapted in a manner dependent on the desired braking behavior and/or force assistance. The cam track may also be adapted in a manner dependent on the torque curve of the actuating motor, because the torque curve is not linear.

The cam track(s) is/are preferably configured to be continuously differentiable in terms of theft gradients.

In a further advantageous embodiment, the actuating drive has a second ramp bearing for the brake application movement, wherein the second ramp bearing has one or more cam tracks with one or more linear and/or non-linear regions.

The different regions can be configured accordingly for different tasks, as demonstrated by the following advantageous embodiment: the second ramp bearing has a first region with a steep gradient for quickly overcoming an air gap and has a second region with a shallow gradient for generating high brake application forces.

The cam track(s) of the first and second ramp bearings are preferably coordinated with one another such that a bistable or unstable situation for the actuating (brake application) device can be achieved over certain angles of rotation of the actuating device. In this way, self-releasing or self-tensioning/self-energizing braking functions can be implemented as required.

In order to combine and thus intensify the effects of the correspondingly configured regions, the first ramp bearing may have two regions that correspond with the second ramp bearing over the angle of rotation, a first and a second region A and B.

Here, an embodiment has proven to be particularly advantageous in which the first region A has a zero gradient for a neutral behavior while overcoming an air gap, and the second region B has a non-linear characteristic which is coordinated such that a bistable situation can be generated over the entire range of the braking intervention. In this way, the brake application force to be imparted by the drive is substantially limited to overcoming system losses (friction losses) and moments of inertia.

The actuating device is advantageously configured with two actuating drives, which can perform a brake application movement jointly or independently of one another. In this way, a redundant solution is provided which continues to allow braking, or a brake application movement of the brake lining, if one of the two actuating drives or actuating motors should fail.

The first or second ramp bearing preferably has a detent position, in particular in the form of an indentation or depression, which forms a detent position for a parking brake function. This can serve as a parking brake function, in particular if a wear-compensating readjustment function is implemented by way of opposite directions of rotation of the actuating drives.

It has furthermore proven to be advantageous if the prestressed spring is fastened by one end to the first ramp bearing and by an opposite end to a brake caliper.

The following features of further advantageous embodiments have not been mentioned in the claims:

Parts of the actuating drive are preferably surrounded by the spring, in particular in the form of a spiral spring, or are arranged within the inner circumference of the spiral spring. This allows a more compact arrangement.

The ramp bearing of the energy recovery unit has rings which are arranged axially one above the other and between which three or more rolling elements, in particular in the form of balls, are movably mounted. For this purpose, the lower ring has a continuously annular depression and the upper ring has one annular or several arcuate depressions. This configuration may also be reversed or mirrored. The two rings have a common axis of rotation at their center point and are rotatable or pivotable about said common axis of rotation.

The ramp bearing of the brake application means likewise has three or more rolling elements, in particular in the form of balls, which are movably supported between two annular components. The depressions in the two components may be shaped similarly to those of the ramp bearing of the energy recovery unit.

The figures described below relate to preferred exemplary embodiments of the actuating device and of the axle drive unit. The figures serve not for limiting but substantially for illustrating the present disclosure. Where reference designations are repeated across figures, the description of an element from one figure may also be valid for the element in other figures.

FIG. 1 shows a perspective view of a mechanical brake system with an actuating device according to an exemplary embodiment according to the invention. Braking is performed by means of the brake application movement and pressing of a brake lining 2 against a brake disk 1. The brake lining 2 is in this case part of a brake shoe. An actuating device is used for the brake application movement of the brake lining 2. The actuating device has an axially displaceable actuating bolt 7, a spiral spring 8 as an energy store, a first gearbox 4 for a first actuating motor 3, a second gearbox 6 for a second actuating motor 5, and a mounting plate 9 as an axial bearing and connection to a brake caliper (not shown in full). The brake caliper has the brake lining 2 as a brake part and the actuating device, wherein the actuating device is in particular arranged in a housing. The brake caliper is arranged on or around the brake disk 1.

Figure 2:
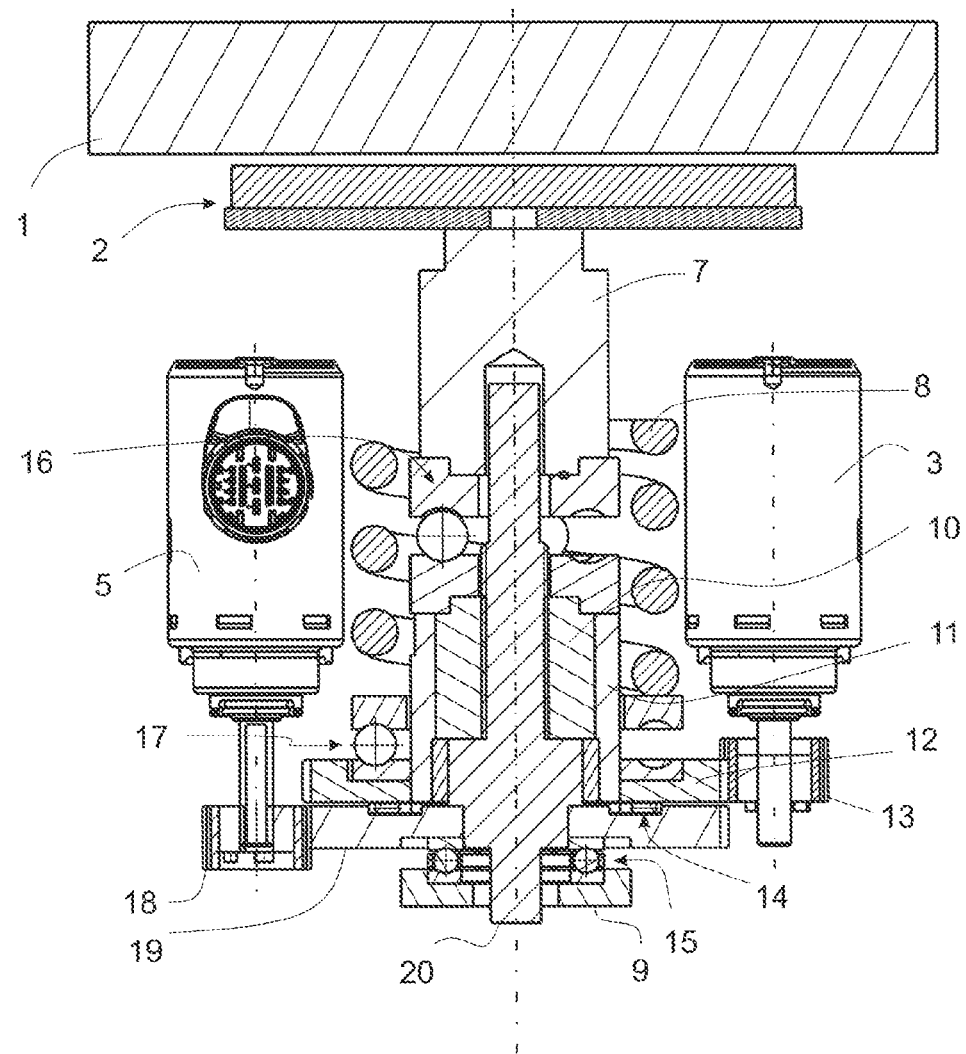
FIG. 2 is a cross-sectional view of the mechanical brake system from FIG. 1.

FIG. 2 shows a cross-sectional view of the mechanical brake system from FIG. 1, wherein the cross-sectional plane A-A is indicated in FIG. 1. Additional details are illustrated here. The brake lining 2 can be caused to perform a plane-parallel brake application movement toward the brake disk 1. The brake application movement is performed in particular by way of the axial displacement of an actuating nut 10 on which an annular part of the ramp bearing 16 as brake application means is arranged fixedly in terms of rotation. The ramp bearing 16 has spherical rolling elements and, on its other or opposite side, is fastened fixedly in terms of rotation to the actuating bolt 7. This means that a rotation of the actuating nut 10 during the axial displacement thereof is not transmitted to the actuating bolt 7. The actuating nut 10 is in operative engagement both with an actuating spindle 20 and with an actuating sleeve 11 and can be moved (or also blocked—parking function) by means of one or both of these components 20, 11. The actuating spindle 20 has a spindle-like external thread which is in operative engagement with an internal thread of the actuating nut 10. In this way, a rotation of the actuating spindle 20 can be transformed into an axial movement of the actuating nut 10. The actuating sleeve 11 has, on its inner circumference, multiple rectilinear grooves which are arranged parallel to the axis and which are in operative engagement with the inversely identically formed external grooves of the actuating nut 10, Here, a rotation of the actuating sleeve 11 can lead to an axial movement of the actuating nut 10. The actuating sleeve 11 is fastened to a toothed gear 12 which can be driven and set in rotation via a drive pinion 13 of the actuating motor 3. The gearbox 4 described in FIG. 1 (also referred to as gearbox A) is formed by the toothed gear 12 and the drive pinion 13. A first, lower annular component of the ramp bearing 17 of the energy recovery unit is fastened to the upper side of the toothed gear 12. The second, upper annular component of the ramp bearing 17 is mounted on the first component by means of spherical rolling elements. The second annular component is pressed onto the rolling elements, and thus onto the first component, by means of a prestressed spiral spring 8 as an energy store. The second component of the ramp bearing 17 is fixedly connected only to the spiral spring 8, or is in operative engagement with the spiral spring 8 and the rolling elements, in order that, inter glia, the actuating sleeve 11 can rotate independently of this component. The toothed gear A 12 is mounted rotatably on a toothed gear B 19 by means of an axial bearing or needle roller bearing 14, wherein the needle roller bearing 14 is arranged on the upper side of the toothed gear B 19 and fastened thereto. The gearbox 6 described in FIG. 1 (also referred to as gearbox B) is formed by the toothed gear 19 and the drive pinion 18. The toothed gear 19 is fixedly connected to the actuating spindle 20 and sets this in rotation by means of the actuating motor 5. The toothed gear B 19 is connected rotatably to the mounting plate 9 by means of an axial bearing or ball bearing 15. The mounting plate 9 serves as a mount for the ball bearing 15 and is fixedly connected to the brake caliper (not illustrated). All components of the actuating device are arranged coaxially around the axis of rotation of the spindle 20.

Figure 3:
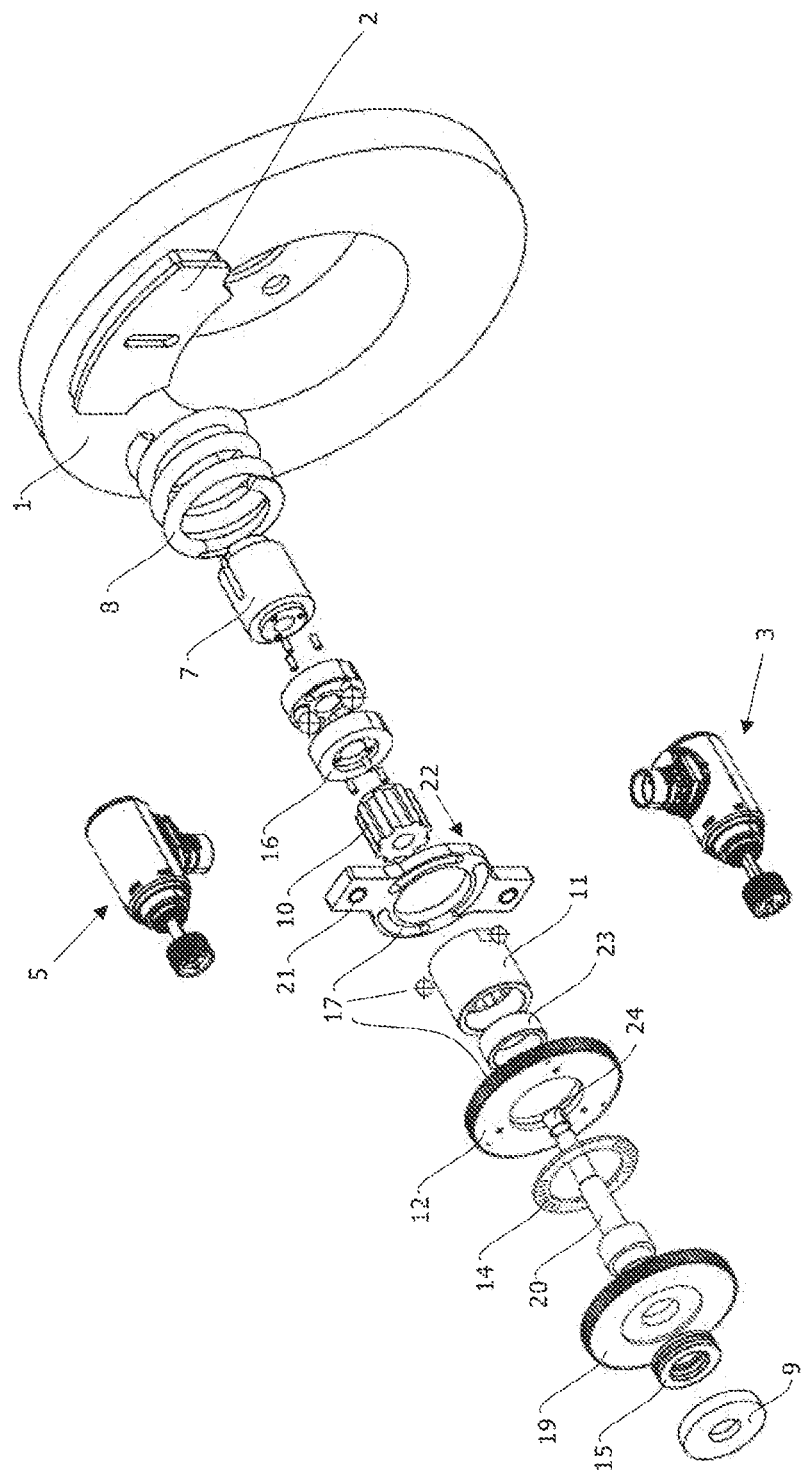
FIG. 3 is a detail view of the mechanical brake system from FIG. 1.

FIG. 3 shows an exploded illustration of the mechanical brake system from FIG. 1 or FIG. 2. In addition to the elements or components described above, a first sliding sleeve 23 and a second sliding sleeve 24 are illustrated in detail. The first sliding sleeve 23 is arranged between the actuating spindle 20 and the actuating sleeve 11 and, as a sliding contact/surface, allows a rotatable mounting of spindle 20 and actuating sleeve 11. The second sliding sleeve 24 is arranged between the actuating spindle 20 and the actuating bolt 7 and, as a sliding contact/surface, allows a rotatable mounting of the spindle 20 relative to the actuating bolt 7. The sliding sleeves 23, 24 serve in particular for position stabilization, and stabilization against tilting, of the components that are in contact with the sliding sleeves. The ramp bearing 17 is formed by an upper annular component with three arcuate depressions, three spherical rolling elements arranged in the depressions and by a lower annular component (in particular as an insert in the toothed gear 12) with an annular depression (not visible). The upper component of the ramp bearing 17 also has an anti-rotation device 21 and, on the upper side, a bearing surface 22 for the spring 8. The anti-rotation device 21 is fastened, for example, to an axially extending rod or rail (not illustrated) such that the upper part of the ramp bearing 17 is axially displaceable and the force of the spring 8 can be transmitted to the rolling elements, via the toothed gear 12 and finally to the actuating sleeve 11. Similarly to the ramp bearing 17 of the energy recovery unit, the ramp bearing 16 of the brake application means has an upper annular component with three arcuate depressions, three spherical rolling elements arranged in the depressions, and a lower annular component with an annular depression (not visible). The upper component and the lower component of the ramp bearing 16 are connected fixedly in terms of rotation to the actuating bolt 7 and to the actuating nut 10 in each case by means of three pins.

Figure 4:
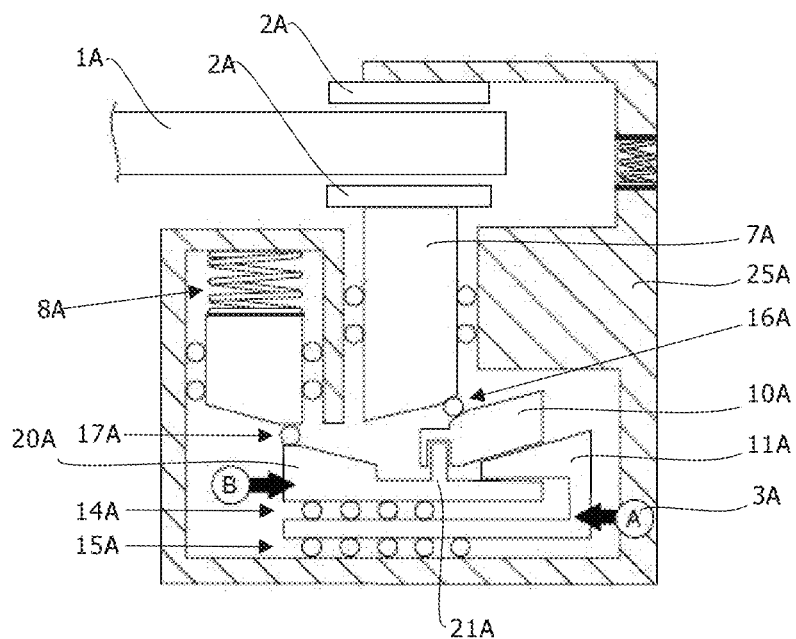
FIG. 4 is a schematic cross-sectional view of an example actuating device in an initial situation.
Figure 5:
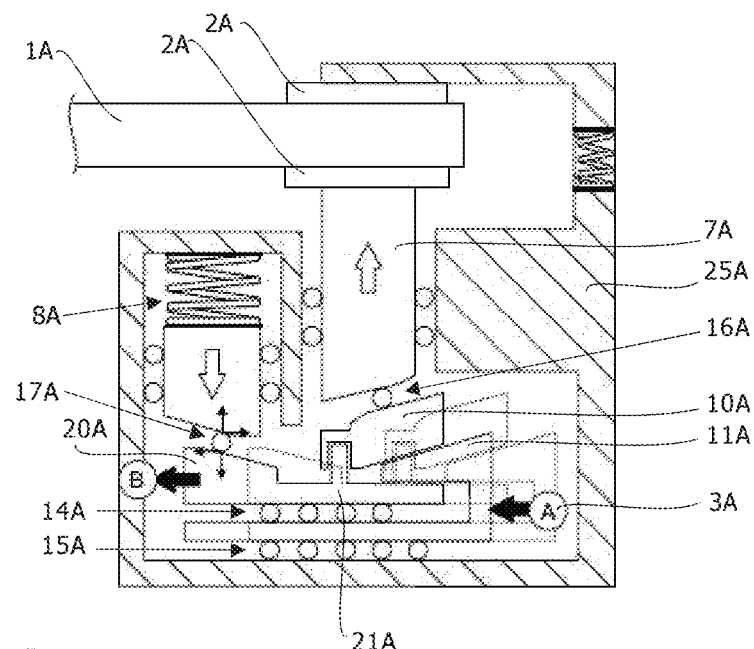
FIG. 5 is a schematic cross-sectional view of the actuating device according to FIG. 4 during a service braking operation.
Figure 6:
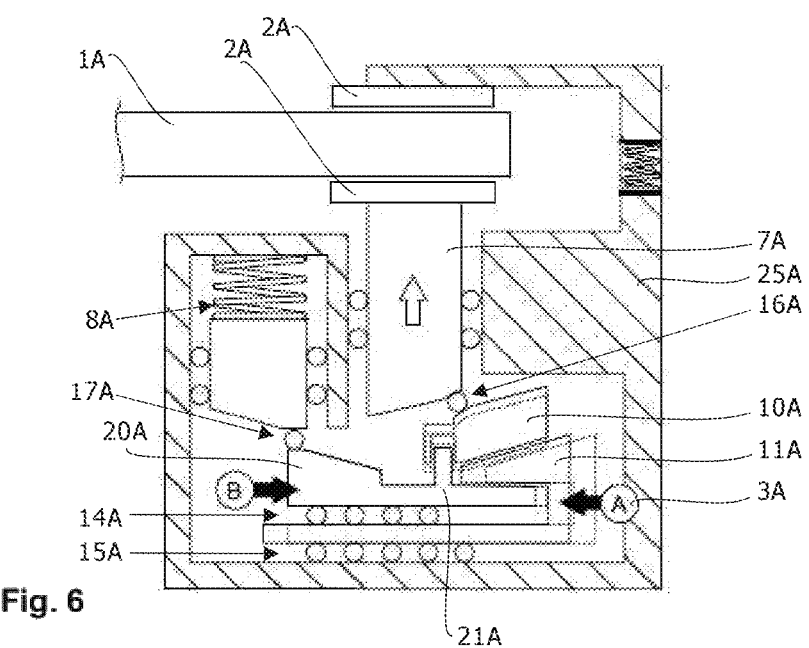
FIG. 6 is a schematic cross-sectional view of an actuating device according to FIG. 5 during a wear-compensating readjustment.

FIGS. 4, 5 and 6 each show a schematic cross-sectional view of an actuating device according to the invention; firstly in an initial position, then during a service braking operation, and finally during a wear-compensating readjustment. The cross-sectional view illustrates in particular the forces acting on the components of the actuating device and their directions of force with respect to one another. Similar components have already been described in FIGS. 1 to 3 and reference numerals used in FIGS. 4-6 correspond to reference numerals used for similar features in FIGS. 1-3, with the addition of a trailing "A." It is possible to clearly see the function of the actuating nut 10A, which can be moved both by the actuation of the actuating drive A with the actuating sleeve 11A (based on the actuating motor A) and by the actuation of the actuating drive B with the actuating spindle 20A (based on the actuating motor B). The actuating bolt 7A is displaced, and the brake application movement of the brake lining 2A is effected, by means of the movement of the actuating nut 10A, for example by horizontal displacement by means of the actuating drive B (see FIG. 5) or by vertical displacement by means of the actuating drive A (see FIG. 6). During the service braking operation in FIG. 5, the force of the force cartridge with the prestressed spring 8A and the ramp bearing 17A assists the actuating drive B. The cross-sectional views illustrate the two brake linings 2A, which are arranged in the brake caliper 25A and which are displaced, or caused to perform a brake application movement, by means of the actuating device.

LIST OF REFERENCE DESIGNATIONS

1 Brake disk
2 Brake shoe with brake lining
3 Actuating motor A
4 Gearbox A
5 Actuating motor B
6 Gearbox B
7 Actuating bolt
8 Spring as energy store
9 Axial bearing mounting plate/connection to the brake caliper
10 Actuating nut
11 Actuating sleeve
12 Toothed gear A
13 Drive pinion A
14 Axial bearing/needle roller bearing
15 Axial bearing/ball bearing
16 Ramp bearing (brake application movement)
17 Ramp bearing (energy recovery unit)
18 Toothed gear B
19 Drive pinion B
20 Actuating spindle
21 Anti-rotation device for cam ramp bearing
22 Bearing surface for spring/energy store
23 Sliding sleeve for actuating spindle-actuating bolt sliding contact
24 Sliding sleeve for actuating spindle-actuating sleeve sliding contact
25 Brake caliper

What is claimed is:
1. An actuating device comprising:
an energy recovery unit for a mechanical brake system;
an actuating drive for a brake application movement of a brake part for a service brake function; and
a force cartridge with a prestressed spring and with a ramp bearing as the energy recovery unit, wherein the ramp bearing is fastened to the actuating drive on a first side and to the prestressed spring on a second side, wherein the force cartridge is fitted on a line of force action of the actuating drive and is configured to interact with the actuating drive such that a force component for assisting the actuating drive is provided based on an adjustment position of the actuating drive;

wherein the ramp bearing is a first ramp bearing, the actuating device comprising a second ramp bearing for the brake application movement, wherein the second ramp bearing includes a cam track with a linear region and with a non-linear region;

wherein the first ramp bearing includes a first region and a second region that correspond with the second ramp bearing over a 1 angle of rotation;

wherein the first region has a zero gradient for a neutral behavior while overcoming an air gap, wherein the second region has a non-linear characteristic that is coordinated such that a bistable situation can be generated over an entire range of a braking intervention.

2. The actuating device of claim 1 wherein the actuating drive is a first actuating drive, the actuating device comprising a second actuating drive, wherein the first and second actuating drives are configured to perform a brake application movement jointly.

3. The actuating device of claim 1 wherein the actuating drive is a first actuating drive, the actuating device comprising a second actuating drive, wherein the first and second actuating drives are configured to perform brake application movements independently of one another.

4. The actuating device of claim 1 wherein the ramp bearing has a detent position that forms a detent position for a parking brake function.

5. The actuating device of claim 4 wherein the detent position is an indentation or a depression.

6. The actuating device of claim 1 wherein the prestressed spring is fastened by a first end to the ramp bearing and by a second end, opposite the first end, to a brake caliper.

7. An actuating device comprising:
an energy recovery unit for a mechanical brake system;
an actuating drive for a brake application movement of a brake part for a service brake function; and
a force cartridge with a prestressed spring and with a ramp bearing as the energy recovery unit, wherein the ramp bearing is fastened to the actuating drive on a first side and to the prestressed spring on a second side, wherein the force cartridge is fitted on a line of force action of the actuating drive and is configured to interact with the actuating drive such that a force component for assisting the actuating drive is provided based on an adjustment position of the actuating drive;
wherein the actuating drive is a first actuating drive, the actuating device comprising a second actuating drive, wherein the first and second actuating drives are configured to perform brake application movements independently of one another.

8. The actuating device of claim 7 wherein the ramp bearing has a cam track with a linear region.

9. The actuating device of claim 7 wherein the ramp bearing has a cam track with a non-linear region.

10. The actuating device of claim 7 wherein the ramp bearing has a cam track with a linear region and with a non-linear region.

11. The actuating device of claim 7 wherein the ramp bearing is a first ramp bearing, the actuating device comprising a second ramp bearing for the brake application movement, wherein the second ramp bearing includes a cam track with a linear region.

12. The actuating device of claim 7 wherein the ramp bearing is a first ramp bearing, the actuating device comprising a second ramp bearing for the brake application movement, wherein the second ramp bearing includes a cam track with a non-linear region.

13. The actuating device of claim 7 wherein the ramp bearing is a first ramp bearing, the actuating device comprising a second ramp bearing for the brake application movement, wherein the second ramp bearing includes a cam track with a linear region and/or a non-linear region, wherein the second ramp bearing has a first region with a steep gradient for overcoming an air gap and a second region with a shallow gradient for generating brake application forces.

14. The actuating device of claim 13 wherein the cam track of the second ramp bearing is coordinated with a cam track of the first ramp bearing such that a bistable or unstable situation for the brake application device is achievable over certain angles of rotation of the actuating device.

15. An actuating device comprising:
an energy recovery unit for a mechanical brake system;
an actuating drive for a brake application movement of a brake part for a service brake function; and
a force cartridge with a prestressed spring and with a ramp bearing as the energy recovery unit, wherein the ramp bearing is fastened to the actuating drive on a first side and to the prestressed spring on a second side, wherein the force cartridge is fitted on a line of force action of the actuating drive and is configured to interact with the actuating drive such that a force component for assisting the actuating drive is provided based on an adjustment position of the actuating drive;
wherein the ramp bearing has a detent position that forms a detent position for a parking brake function.

16. The actuating device of claim 15 wherein the detent position is an indentation or a depression.

17. The actuating device of claim 15 wherein the ramp bearing has a cam track with a linear region.

18. The actuating device of claim 15 wherein the ramp bearing has a cam track with a non-linear region.

19. The actuating device of claim 15 wherein the ramp bearing has a cam track with a linear region and with a non-linear region.

20. The actuating device of claim 15 wherein the ramp bearing is a first ramp bearing, the actuating device comprising a second ramp bearing for the brake application movement, wherein the second ramp bearing includes a cam track with a linear region and/or a non-linear region, wherein the second ramp bearing has a first region with a steep gradient for overcoming an air gap and a second region with a shallow gradient for generating brake application forces.

* * * * *